United States Patent [19]

Appel et al.

[11] Patent Number: 4,539,853
[45] Date of Patent: Sep. 10, 1985

[54] MAGNETIC FLOWMETER

[75] Inventors: Eggert Appel, Dransfeld; Gottfried Geisler, Goettingen; Wilfried Kiene, Hann-Muenden, all of Fed. Rep. of Germany

[73] Assignee: Fischer & Porter Company, Warminster, Pa.

[21] Appl. No.: 625,205

[22] Filed: Jun. 27, 1984

[30] Foreign Application Priority Data

Oct. 12, 1983 [DE] Fed. Rep. of Germany ....... 3337151

[51] Int. Cl.³ .............................................. G01F 1/58
[52] U.S. Cl. .............................. 73/861.12; 73/861.14; 73/861.16
[58] Field of Search ........... 73/861.12, 861.13, 861.14, 73/861.15, 861.16, 861.17, 861.11

[56] References Cited

U.S. PATENT DOCUMENTS

| | | | |
|---|---|---|---|
| 2,766,621 | 10/1956 | Raynsford et al. | 73/861.12 |
| 3,999,443 | 12/1976 | Appel et al. | 73/861.12 |
| 4,019,386 | 4/1977 | Appel et al. | 73/861.12 |
| 4,098,118 | 7/1978 | Schmoock | 73/861.12 |

*Primary Examiner*—Donald O. Woodiel
*Attorney, Agent, or Firm*—Michael Ebert

[57] ABSTRACT

A magnetic flowmeter which includes a spool formed by a metallizable ceramic through which the fluid to be metered is conducted. The outer surface of the spool is metallized in its central region to define a pair of metering electrodes at diametrically-opposed positions, an electromagnetic field being established within the spool whereby when the flowing fluid intercepts this field, an emf is induced therein to produce a signal at the metering electrodes which is a function of flow rate. Overlying each metering electrode and projecting from the spool is a ceramic block whose outer surface is metallized to define a shield electrode which covers the metering electrode.

8 Claims, 6 Drawing Figures

MAGNETIC FLOWMETER

BACKGROUND OF INVENTION

Field of Invention

This invention relates generally to magnetic flowmeters, and more particularly to a flowmeter of this type which includes a ceramic flow tube or spool through which the fluid to be metered is conducted, the ceramic spool being metallized to define the measuring and shield electrodes of the flowmeter.

Magnetic flowmeters such as those disclosed in U.S. Pat. Nos. 3,695,104; 3,824,856; 3,783,687 and 3,965,738, are especially adapted to measure the volumetric flow rates of fluids which present difficult handling problems, such as corrosive acids, sewage and slurries. Because the instrument is free of flow obstructions, it does not tend to plug or foul.

In a magnetic flowmeter, an electromagnetic field is generated whose lines of flux are mutually perpendicular to the longitudinal axis of the flow tube or spool through which the fluid to be metered is conducted and to the transverse axis along which the measuring electrodes are located at diametrically-opposed positions with respect to the spool. The operating principles are based on Faraday's law of induction, which states that the voltage induced across any conductor as it moves at right angles through a magnetic field will be proportional to the velocity of that conductor. The metered fluid effectively constitutes a series of fluid conductors moving through the magnetic field; the more rapid the rate of flow, the greater the instantaneous value of the voltage established at the electrodes.

German patent publications DE-PS No. 24 54 469 and DE-PS No. 25 05 427 disclose magnetic flowmeters whose flow metering spool is fabricated of a non-magnetizable metal, the inner surface of the spool being covered by an electrical insulating liner. Embedded in this liner are the measuring and shield electrodes of the meter.

Embedment of the measuring and shield electrodes in the liner of the metering spool often results in hair line cracks and separation of the electrodes from the spool. This in turn gives rise to microphonic signals which adversely affect the measuring signal derived from the metering electrodes and degrade the accuracy of the flow rate reading.

Liners are often made of a fluorocarbon material, such as PTFE, this material being used because of its excellent chemical corrosion resistance properties. However, it is difficult to achieve adhesion between a fluorocarbon liner and the spool, and even a small negative pressure produced in the spool in the course of flow may cause separation therebetween.

In addition, microphonic noise often results from the cable connecting the metering electrodes to a preamplifier or an impedance converter having a high input impedance by reason of even small vibrations arising from the motion of the connecting cable relative to the spool.

Another disadvantage of prior art types of magnetic flowmeters is that the shield electrode which is intended to eliminate capacitive coupling between the metering electrodes and the spool does not cover the metering electrode to a sufficient extent to completely eliminate this undesirable coupling. An increase in the dimensions of the shield electrode in known forms of magnetic flowmeters is usually not feasible because the uncovered angle of the flow tube or spool is required for the electromagnetic system.

SUMMARY OF INVENTION

In view of the foregoing, the main object of this invention is to provide a magnetic flowmeter in which microphonic noise effects are substantially eliminated whereby the meter yields an output signal that is accurately proportional to flow rate.

More particularly, an object of this invention is to provide a flowmeter of the above type in which the metering electrodes are shielded to an extent substantially eliminating capacitive coupling effects.

Also an object of this invention is to provide a flowmeter which is highly compact and which operates efficiently and reliably.

Briefly stated, these objects are attained in a magnetic flowmeter which includes a spool formed by a metallizable ceramic through which the fluid to be metered is conducted. The outer surface of the spool is metallized in its central region to define a pair of metering electrodes at diametrically-opposed positions, an electromagnetic field being established within the spool whereby when the flowing fluid intercepts this field, an emf is induced therein to produce a signal at the metering electrodes which is a function of flow rate. Overlying each metering electrode and projecting from the spool is a ceramic block whose outer surface is metallized to define a shield electrode which covers the metering electrode.

OUTLINE OF DRAWINGS

For a better understanding of the invention as well as other objects and further features thereof, reference is made to the following detailed description to be read in conjunction with the accompanying drawings, wherein.

DESCRIPTION OF INVENTION

Figure 1:
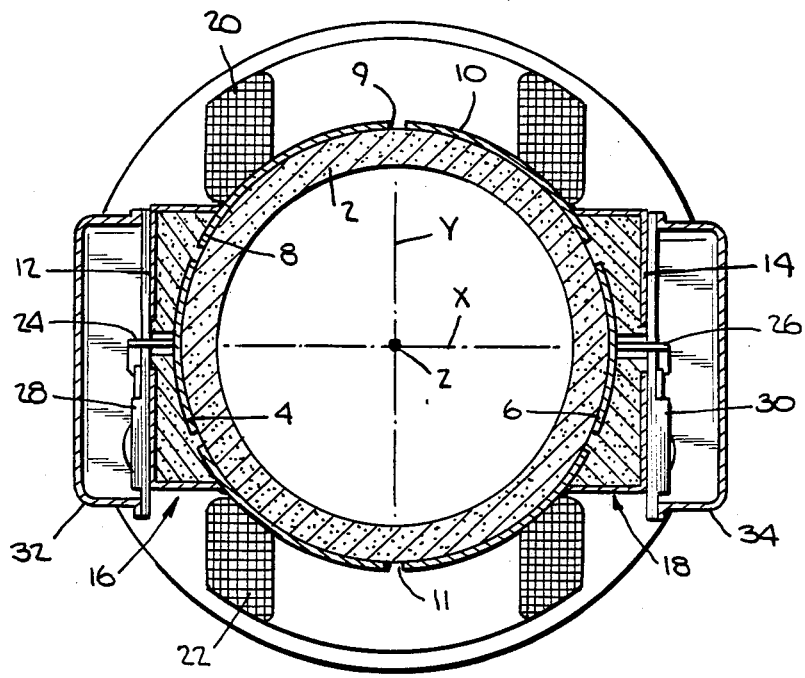
FIG. 1 is a transverse section taken through a magnetic flowmeter in accordance with the invention.
Figures 3, 4:
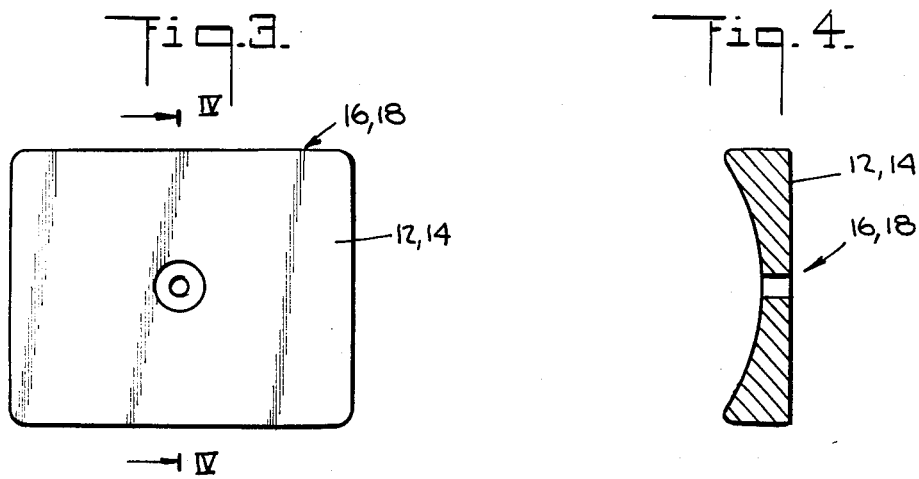
FIG. 3 is a plan view of the block for supporting the shield electrode.
FIG. 4 is a section taken through the block shown in FIG. 3 on the plane indicated by line IV—IV therein.
Figure 2:
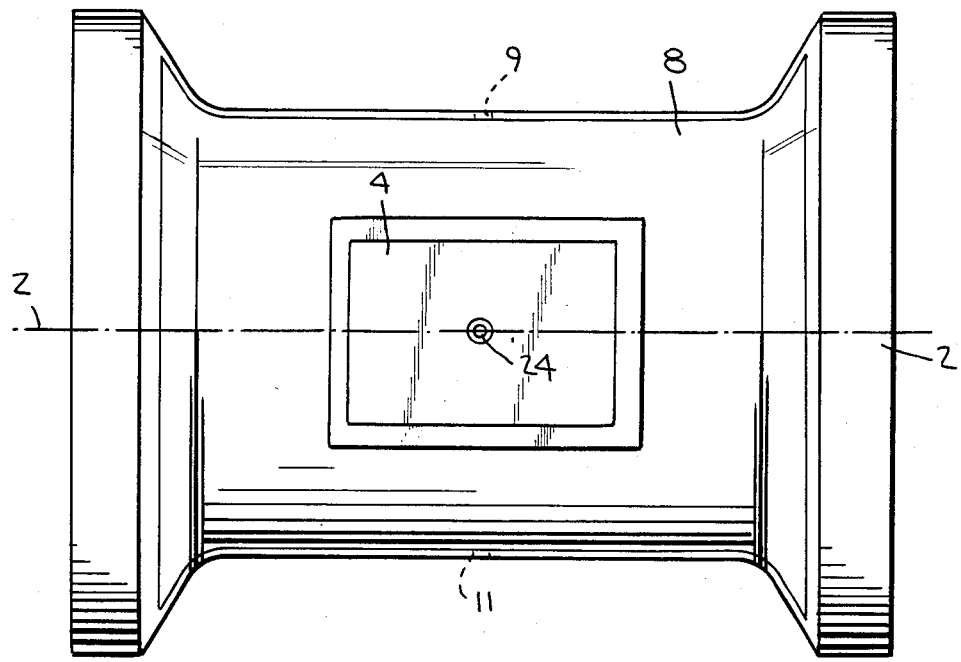
FIG. 2 is a side view of the flowmeter omitting the block for the shield electrode, thereby exposing the measuring electrode.
Figure 5:
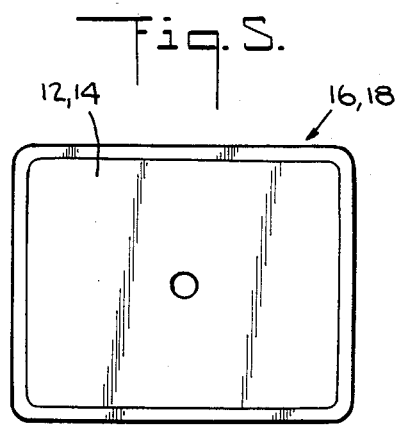
FIG. 5 is an inner view of the shield block of FIG. 3.
Figure 6:
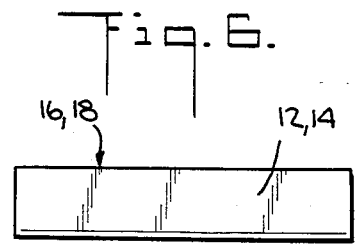
FIG. 6 is a side view of the shield block.

Referring now to the figures, a magnetic flowmeter according to the invention includes a cylindrical metering spool 2 having end flanges of enlarged diameter. The spool is formed of a metallizable ceramic, such as aluminum oxide, having good electrical insulating properties and sufficient structural strength for its intended purpose.

A pair of non-magnetic metering electrodes 4 and 6 are metallized, as by vacuum deposition, on the outer surface of spool 2 in the central region thereof at diametrically opposed positions. Metering electrodes 4 and 6 which conform to the curvature of the spool and have a rectangular form, are symmetrically disposed with respect to the electrode axis X which is normal to the longitudinal flow axis Z of the spool. A pair of electromagnetic field coils 20 and 22 are mounted on the outer surface of the spool at diametrically opposed positions thereon, these coils being symmetrically disposed with respect to the coil axis Y which is mutually perpendicular to axes X and Z.

Also metallized on the outer surface of spool 2 in the area which surrounds the metering electrodes 4 and 6 are symmetrically disposed shielding regions 8 and 10, these being separated by diametrically-opposed gaps 9 and 11.

Covering the pair of metering electrodes 4 and 6 and projecting from the spool are a pair of blocks 16 and 18, respectively, each provided with a concave inner surface to conform to the curvature of the spool, the blocks being formed of metallizable ceramic material. The surface of blocks 16 and 18 are metallized to define shield electrodes 12 and 14, respectively. The edges of these shield electrodes 12 and 14 are soldered to shield regions 8 and 10.

Supported on the outer faces of blocks 16 and 18 are impedance converters 28 and 30, respectively. These are connected to metering electrodes 4 and 6 by leads 24 and 26 which go through an opening in the center of shield electrodes 12 and 14 and pass through the ceramic blocks.

The impedance converters or pre-amplifiers 28 and 30, which are preferably constructed of a hybrid module, are housed within metal shield cups 32 and 34, respectively, whose edges are soldered to the corresponding regions in the metallized shields 12 and 14 on blocks 16 and 18.

Thus in the magnetic flowmeter arrangement in accordance with the invention, the metering electrodes are almost entirely covered by shield electrodes on the exterior of the spool. Since the electrodes are metallized, they have a negligible thickness which may be less than $10\mu$. Hence the electrodes do not interfere with the function of the electromagnetic field coils. The invention makes it possible to reduce the stray capacitance of the metering electrodes to less than 0.5% of the electrode coupling capacitance.

While one may effect a connection between the elements of the shielding electrodes by pressing them together, the use of soldering to bring about this connection is preferred. And by mounting the preamplifiers or impedance converters within the shield cups on the block covering the metering electrodes, one thereby eliminates a source of microphonics that otherwise would result from a cable connection to these amplifiers.

The use of a good thermally conducting ceramic substrate in the hybrid circuit of the impedance converter results in a very uniform temperature of the electronic elements in the converter to ensure signal stability.

Thus the arrangement provides a compact and substantially noise-free magnetic flowmeter in which deleterious microphonic signals are effectively eliminated.

While there has been shown and described a preferred embodiment of a magnetic flowmeter in accordance with the invention, it will be appreciated that many changes and modifications may be made therein without, however, departing from the essential spirit thereof.

We claim:

1. A magnetic flowmeter comprising:
   A. a spool formed of a metallizable ceramic through which is flowable the fluid to be metered;
   B. a pair of metering electrodes metallized on the outer surface of the spool in the central region thereof at diametrically opposed positions on an electrode axis that is normal to the flow axis of the spool;
   C. a pair of electromagnetic coils on the exterior of the spool at diametrically opposed positions on a coil axis that is normal both to the electrode axis and the flow axis to produce an electromagnetic field in the spool which is intercepted by the fluid to induce an emf therein to produce a signal at the metering electrodes which is a function of flow rate; and
   D. a block of metallizable ceramic overlying each metering electrode and projecting from the spool, the outer surface of said block being metallized to define a shield electrode which covers the metering electrode.

2. A magnetic flowmeter as set forth in claim 1, wherein the outer area of the flow tube which surrounds the metering electrodes is metallized to define a pair of symmetrical shielding regions.

3. A flowmeter as set forth in claim 2, wherein said shielding regions are provided with a pair of diametrically-opposed gaps.

4. A flowmeter as set forth in claim 2, wherein the edges of the metallized shield electrodes are soldered to the related metallized shielding region.

5. A flowmeter as set forth in claim 4, wherein a preamplifier supported on the outer face of the block is connected by a lead to the metering electrode.

6. A flowmeter as set forth in claim 5, wherein said preamplifier is covered by a metal shield cup.

7. A flowmeter as set forth in claim 6, wherein the edge of the shield cup is soldered to the shield electrode on the block.

8. A flowmeter as set forth in claim 1, wherein said spool and said block is formed of aluminum oxide ceramic.

* * * * *